US012271150B2

(12) United States Patent
Katsura et al.

(10) Patent No.: US 12,271,150 B2
(45) Date of Patent: Apr. 8, 2025

(54) TONER

(71) Applicant: CANON KABUSHIKI KAISHA, Tokyo (JP)

(72) Inventors: Taiji Katsura, Shizuoka (JP); Shohei Tsuda, Shizuoka (JP); Tatsuya Saeki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 568 days.

(21) Appl. No.: 17/653,553

(22) Filed: Mar. 4, 2022

(65) Prior Publication Data

US 2022/0291601 A1 Sep. 15, 2022

(30) Foreign Application Priority Data

Mar. 12, 2021 (JP) ................................. 2021-040525

(51) Int. Cl.
*G03G 9/08* (2006.01)
*G03G 9/087* (2006.01)
*G03G 9/097* (2006.01)

(52) U.S. Cl.
CPC ....... *G03G 9/0821* (2013.01); *G03G 9/08711* (2013.01); *G03G 9/08755* (2013.01); *G03G 9/08782* (2013.01); *G03G 9/09733* (2013.01)

(58) Field of Classification Search
CPC ............. G03G 9/0821; G03G 9/08711; G03G 9/08755; G03G 9/08782; G03G 9/09733; G03G 9/08795; G03G 9/08797; G03G 9/09791
See application file for complete search history.

(56) References Cited

U.S. PATENT DOCUMENTS

| | | | |
|---|---|---|---|
| 9,470,993 | B2 | 10/2016 | Nishikawa et al. |
| 9,575,425 | B2 | 2/2017 | Naka et al. |
| 9,588,450 | B2 | 3/2017 | Tsuda et al. |
| 9,606,462 | B2 | 3/2017 | Nomura et al. |
| 9,632,441 | B2 | 4/2017 | Abe et al. |
| 9,658,546 | B2 | 5/2017 | Tanaka et al. |
| 9,715,188 | B2 | 7/2017 | Terauchi et al. |
| 9,720,340 | B2 | 8/2017 | Tominaga et al. |
| 9,772,570 | B2 | 9/2017 | Tsuda et al. |
| 9,778,583 | B2 | 10/2017 | Terauchi et al. |
| 9,857,707 | B2 | 1/2018 | Tsuda et al. |
| 9,904,195 | B2 | 2/2018 | Matsui et al. |
| 10,012,919 | B2 | 7/2018 | Matsui et al. |
| 10,114,303 | B2 | 10/2018 | Katsura et al. |
| 10,156,800 | B2 | 12/2018 | Tsuda et al. |
| 10,197,934 | B2 | 2/2019 | Matsui et al. |
| 10,241,430 | B2 | 3/2019 | Kimura et al. |
| 10,289,016 | B2 | 5/2019 | Fukudome et al. |
| 10,295,921 | B2 | 5/2019 | Ohmori et al. |
| 10,578,990 | B2 | 3/2020 | Tsuda et al. |
| 10,635,011 | B2 | 4/2020 | Umeda et al. |
| 10,747,134 | B2 | 8/2020 | Watanabe et al. |
| 10,768,540 | B2 | 9/2020 | Watanabe et al. |
| 10,782,623 | B2 | 9/2020 | Yoshiba et al. |
| 10,942,466 | B2 | 3/2021 | Tominaga et al. |
| 10,969,704 | B2 | 4/2021 | Kagawa et al. |
| 10,976,678 | B2 | 4/2021 | Yamawaki et al. |
| 10,976,679 | B2 | 4/2021 | Tanaka et al. |
| 11,003,104 | B2 | 5/2021 | Katsura et al. |
| 11,003,105 | B2 | 5/2021 | Sato et al. |
| 11,112,708 | B2 | 9/2021 | Uratani et al. |
| 11,112,709 | B2 | 9/2021 | Saeki et al. |
| 11,112,712 | B2 | 9/2021 | Matsunaga et al. |
| 11,112,713 | B2 | 9/2021 | Akiyama et al. |
| 11,169,460 | B2 | 11/2021 | Kototani et al. |
| 11,249,408 | B2 | 2/2022 | Tsuda et al. |
| 2014/0205944 | A1 | 7/2014 | Masuda |
| 2015/0125790 | A1 | 5/2015 | Hotta et al. |
| 2015/0248072 | A1 | 9/2015 | Katsuta et al. |
| 2017/0307993 | A1* | 10/2017 | Sano ................. G03G 9/08797 |

(Continued)

FOREIGN PATENT DOCUMENTS

| | | | |
|---|---|---|---|
| JP | 10-133412 | A | 5/1998 |
| JP | 2010-145552 | A | 7/2010 |
| JP | 2010-145553 | A | 7/2010 |
| JP | 2013-105128 | A | 5/2013 |
| JP | 2017-44980 | A | 3/2017 |
| JP | 2021-9251 | A | 1/2021 |
| WO | 2013/047296 | A1 | 4/2013 |

OTHER PUBLICATIONS

Fedors, A Method for Estimating Both the Solubility Parameters and Molar vols. of Liquids, Poly. Eng. and Sci., vol. 14, No. 2 (1974) 147-54.

U.S. Appl. No. 17/655,414, Hidekazu Fumita, filed Mar. 18, 2022.

*Primary Examiner* — Stewart A Fraser

(74) *Attorney, Agent, or Firm* — VENABLE LLP

(57) ABSTRACT

A toner comprising a toner particle comprising a binder resin, a crystalline material A, and a crystalline material B, wherein the binder resin contains a resin M in an amount of 70 mass % or more relative to the binder resin, the crystalline material A has a melting point of 50.0° C. to 100.0° C., and when, the difference between the SP value of the resin M and material A is designated as ΔSPAM, the difference between the SP value of the resin M and crystalline material B is designated as ΔSPBM, the difference between the SP value of the crystalline material A and crystalline material B is designated as ΔSPAB, the peak molecular weight of the crystalline material A and crystalline material B is designated as MpA and MpB each, the formulae (1) to (3) are satisfied:

$$50 \leq MpB \times \Delta SPBM^2 - MpA \times \Delta SPAM^2 \leq 450 \quad (1)$$

$$MpA \times \Delta SPAM^2 \leq 800 \quad (2)$$

$$\Delta SPAB \leq 0.26 \quad (3).$$

10 Claims, No Drawings

(56) References Cited

U.S. PATENT DOCUMENTS

| | | | |
|---|---|---|---|
| 2018/0210361 | A1 | 7/2018 | Katsura et al. |
| 2021/0003934 | A1 | 1/2021 | Fumita et al. |
| 2021/0373450 | A1 | 12/2021 | Kawaguchi et al. |
| 2021/0397110 | A1 | 12/2021 | Katsura et al. |
| 2022/0121132 | A1 | 4/2022 | Yoshida et al. |
| 2022/0121133 | A1 | 4/2022 | Yamawaki et al. |

* cited by examiner

TONER

BACKGROUND OF THE INVENTION

Field of the Invention

The present disclosure relates to a toner used in an image-forming method such as an electrophotographic method.

Description of the Related Art

In recent years, there have been demands for electrophotographic image forming apparatuses such as multifunctional devices and printers to consume even less electrical power. In electrophotography methods, an electrostatic latent image is first formed on an electrophotographic photosensitive member (an image-holding body) by carrying out a charging step and an exposure step. The electrostatic latent image is then developed using a developer that contains a toner, and a visible image (a fixed image) is obtained by carrying out a transfer step and a fixing step. Of the steps mentioned above, the fixing step requires a relatively large amount of energy, and investigations have been carried out into reducing the amount of heat produced by fixing devices in particular from the perspective of reducing the amount of energy consumed. In toners, there has been an increased need for so-called low-temperature fixing toners, with which a toner can be fixed with less heat.

Japanese Patent Application Publication No. H10-133412 discloses adding an ester wax having a specific structure and physical properties and a wax having specific heat absorption properties to a binder resin or a toner. Furthermore, it has been proposed that setting the weight average particle diameter of toner particles to fall within a specific range increases the low-temperature fixing performance and offset resistance of the toner.

In addition, WO 2013/047296 discloses using a specific diester compound as a softening agent and setting the softening temperature, flow initiation temperature and glass transition temperature of a toner to fall within specific ranges. It has been proposed that by constituting in this way, it is possible to obtain a toner which exhibits excellent low-temperature fixability and imparts a printed object with high gloss across a broad temperature region.

SUMMARY OF THE INVENTION

However, the patent documents mentioned above do not mention the storability of images printed using obtained toners, and do not provide experimental results for this. In cases where a crystalline plasticizer is added to a toner, such as the toners disclosed in these documents, results showing that low-temperature fixability is improved can be reliably achieved.

A plasticizing effect such as that achieved by a crystalline plasticizer increases depending on the added amount of the plasticizer, but if the added amount of a plasticizer is increased, the storability of a printed image tends to decrease. Specifically, a plasticizer gradually crystallizes in a printed image after being left in a high temperature environment, and because the textured shape of the image surface changes, adverse effects are observed, such as a decrease in image gloss over time.

That is, in cases where the toners disclosed in these documents are used, it was understood that problems still occurred in terms of achieving a balance between low-temperature fixability and printed image storability. The present disclosure provides a toner in which low-temperature fixability and printed image storability can be achieved to a high degree. Specifically, the present disclosure provides a toner which exhibits excellent low-temperature fixability and can suppress changes in gloss over time in a printed image.

The present disclosure relates to a toner comprising a toner particle that comprises a binder resin, a crystalline material A, and a crystalline material B, wherein the binder resin comprises a resin M in an amount of 70 mass % or more relative to a total mass of the binder resin, the crystalline material A has a melting point of 50.0° C. to 100.0° C., and when, the absolute value of the difference between the SP value of the resin M and the SP value of the crystalline material A is designated as ΔSPAM, the absolute value of the difference between the SP value of the resin M and the SP value of the crystalline material B is designated as ΔSPBM, the absolute value of the difference between the SP value of the crystalline material A and the SP value of the crystalline material B is designated as ΔSPAB, the peak molecular weight Mp of the crystalline material A is designated as MpA, and the peak molecular weight Mp of the crystalline material B is designated as MpB, the following formulae (1) to (3) are satisfied:

$$50 \leq MpB \times \Delta SPBM^2 - MpA \times \Delta SPAM^2 \leq 450 \quad (1)$$

$$MpA \times \Delta SPAM^2 \leq 800 \quad (2)$$

$$\Delta SPAB \leq 0.26 \quad (3)$$

According to the present disclosure, it is possible to obtain a toner which exhibits excellent low-temperature fixability and can suppress changes in gloss over time in a printed image.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified.

Also, when a numerical range is described in a stepwise manner, the upper and lower limits of each numerical range can be arbitrarily combined.

As mentioned above, when a crystalline plasticizer is added to a toner, low-temperature fixability is improved depending on the added amount of the plasticizer, but adverse effects are observed, such as a decrease in image gloss in a printed image after the printed image is left in a high temperature environment. This is thought to be because the plasticizer gradually crystallizes at the surface of the printed image and the textured shape of the image surface changes.

The inventors of the present invention investigated methods for suppressing such adverse effects caused by use of crystalline plasticizers. It was thought that the reason why a plasticizer gradually crystallizes at the surface of a printed image is due to insufficient recrystallization of the plasticizer after fixing. However, plasticizers that readily recrystallize after fixing exhibit low compatibility with binder resins and tend not to be able to achieve a sufficient plasticizing effect. In contrast, if a plasticizer having high compatibility with a binder resin is selected in order to achieve a sufficient plasticizing effect, recrystallization after fixing tends to be insufficient. The inventors of the present invention found that by using two materials, namely a crystalline material A and a crystalline material B, in addition to a binder resin, a high plasticizing effect with respect to a binder resin could be achieved while enabling recrystallization to proceed rapidly after fixing. Specifically, the inventors of the present invention found that the problems mentioned above could be solved by using the toner described below.

A toner comprising a toner particle that comprises a binder resin, a crystalline material A, and a crystalline material B, wherein the binder resin comprises a resin M in an amount of 70 mass % or more relative to a total mass of the binder resin, the crystalline material A has a melting point of 50.0° C. to 100.0° C., and when, the absolute value of the difference between the SP value of the resin M and the SP value of the crystalline material A is designated as ΔSPAM, the absolute value of the difference between the SP value of the resin M and the SP value of the crystalline material B is designated as ΔSPBM, the absolute value of the difference between the SP value of the crystalline material A and the SP value of the crystalline material B is designated as ΔSPAB, the peak molecular weight Mp of the crystalline material A is designated as MpA, and the peak molecular weight Mp of the crystalline material B is designated as MpB, the following formulae (1) to (3) are satisfied:

$$50 \leq MpB \times \Delta SPBM^2 - MpA \times \Delta SPAM^2 \leq 450 \quad (1)$$

$$MpA \times \Delta SPAM^2 \leq 800 \quad (2)$$

$$\Delta SPAB \leq 0.26 \quad (3)$$

The toner particle above contains a resin M, a crystalline material A and a crystalline material B. The crystalline materials are the compounds for which an endothermic peak is observed in differential scanning calorimetric measurements (DSC).

The crystalline material A is unlikely to undergo recrystallization after fixing, while it is a material which exhibits a sufficient plasticizing effect with respect to the resin M that is a primary component of the binder resin. The crystalline material B readily undergoes recrystallization after fixing, however, the plasticizing effect is lower than the crystalline material A. In a case where structural similarities between the crystalline material A and the crystalline material B satisfy certain conditions, it is possible to both achieve a high plasticizing effect with respect to the binder resin and facilitate recrystallization after fixing. That is, because the crystalline material B, which exhibits an excellent nucleating agent effect, acts as a crystal nucleating agent with respect to the crystalline material A, which exhibits excellent plasticizing effect, it is possible to obtain a toner which exhibits excellent low-temperature fixability and can suppress changes in gloss over time in a printed image.

$\chi$ Parameter has been considered as an indicator for illustrating compatibility between two materials, such as a binder resin and a plasticizer. This $\chi$ parameter is proportional to the product of the peak molecular weight Mp of the plasticizer and the square of the difference between the SP values of the two substances. It is known from the Flory-Huggins theory that compatibility between two substances increases as the $\chi$ parameter decreases. It is known that crystalline materials having high compatibility with binder resins generally exhibit an excellent plasticizing effect. In the formula above, a value obtained by multiplying the peak molecular weight Mp of a crystalline material by the square of the difference between the SP values of the crystalline material and the resin M that is a primary component of the binder resin is used as an indicator of plasticizing properties of the crystalline material with respect to the binder resin.

SP value is also known as a value of solubility parameter, and it is a value used as an indicator of solubility or affinity that shows the degree to which a given substance dissolves in another given substance. Substances having similar SP values exhibit high solubility and affinity to each other, whereas substances having different SP values exhibit low solubility and affinity to each other.

SP values can be calculated using the Fedor method. Specifically, this method is explicitly disclosed in Polymer Engineering and Science, Vol. 14, pages 147 to 154, and SP values can be calculated using the following formula:

$$SP \text{ value} = \sqrt{(Ev/v)} = \sqrt{(\Sigma\Delta ei/\Sigma\Delta vi)}$$

(In the formula, Ev denotes evaporation energy (cal/mol), v denotes molar volume ($cm^3$/mol), Δei denotes the evaporation energy of an atom or atomic group, and Δvi denotes the molar volume of an atom or atomic group)

In the toner mentioned above, when, the absolute value of the difference between the SP value of the resin M and the SP value of the crystalline material A is designated as ΔSPAM, the absolute value of the difference between the SP value of the resin M and the SP value of the crystalline material B is designated as ΔSPBM, the absolute value of the difference between the SP value of the crystalline material A and the SP value of the crystalline material B is designated as ΔSPAB, the peak molecular weight Mp of the crystalline material A is designated as MpA, and the peak molecular weight Mp of the crystalline material B is designated as MpB, the following formula (1) must be satisfied:

$$50 \leq MpB \times \Delta SPBM^2 - MpA \times SPAM^2 \leq 450 \quad (1)$$

The first item in the middle part of formula (1) is a value obtained by multiplying the peak molecular weight MpB of the crystalline material B by the square of the absolute value of the difference between the SP value of the crystalline material B and the SP value of the resin M.

That is, the first item in the middle part of formula (1) indicates compatibility between the crystalline material B and the resin M, and the second item in the middle part of the formula indicates compatibility between the crystalline material A and the resin M. Therefore, the middle part of formula (1) is a comparison of compatibility with the resin M between the crystalline material A and the crystalline material B. Two types of crystalline material having different compatibility with the resin M that is a primary component of the binder resin must be used in the toner. A combination of the crystalline material A, which exhibits high compatibility with the resin M, and the crystalline material B, which has lower compatibility with the resin M than the crystalline material A, is used.

Formula (1) indicates that compatibility between the crystalline material A and the resin M is greater than compatibility between the crystalline material B and the resin M, and the difference therebetween must be from 50 to 450. In a case where the middle part of formula (1) is less than 50, the difference in compatibility between the crystalline material A and the crystalline material B with the binder is insufficient, and the effect of facilitating recrystallization of the crystalline material A by the crystalline material B on a fixed image is insufficient. As a result, a reduction in gloss tends to occur in a printed image after being left in a high temperature environment.

However, in a case where the middle part of formula (1) exceeds 450, the crystalline material A and the crystalline material B separate in the binder resin on a fixed image, and a reduction in gloss tends to occur in a printed image after being left in a high temperature environment. The value of $MpB \times \Delta SPBM^2 - MpA \times \Delta SPAM^2$ is preferably 100 to 440, and more preferably 150 to 430.

The toner mentioned above must satisfy the following formula (2):

$$MpA \times \Delta SPAM^2 \leq 800 \quad (2)$$

The left side of formula (2) indicates compatibility between the crystalline material A and the resin M. The left side of formula (2) must be 800 or less. If this value is 800 or less, it is possible to achieve an excellent plasticizing effect with respect to the binder resin. If this value exceeds 800, compatibility between the crystalline material A and the resin M is insufficient and a plasticizing effect is not achieved. As a result, low-temperature fixability deteriorates. The value of $MpA \times \Delta SPAM^2$ is preferably 700 or less, and more preferably 600 or less. The lower limit for this value is not particularly limited, but is preferably 150 or more, and more preferably 350 or more.

The toner mentioned above must satisfy the following formula (3):

$$\Delta SPAB \leq 0.26 \quad (3)$$

ΔSPAB denotes the absolute value of the difference between the SP value of the crystalline material A and the SP value of the crystalline material B, and indicates affinity and structural similarity between the crystalline material A and the crystalline material B.

The absolute value of the difference between the SP value of the crystalline material A and the crystalline material B must be 0.26 or less. If this value is 0.26 or less, there is sufficient structural similarity between the crystalline material A and the crystalline material B, and the effect of facilitating recrystallization of the crystalline material A by the crystalline material B is achieved. If this value exceeds 0.26, the crystalline material A and the crystalline material B are unlikely to be compatible, and a reduction in gloss tends to occur in a printed image after being left in a high temperature environment. The value of ΔSPAB is preferably 0.17 or less, and more preferably 0.12 or less. The lower limit for this value is not particularly limited, but is preferably 0.00 or more, and more preferably 0.01 or more.

The toner particle preferably contains a crystalline material C, which satisfies the characteristics below, in addition to the crystalline materials A and B. That is, when, the absolute value of the difference between the SP value of the resin M and the SP value of the crystalline material C is designated as ΔSPCM, and denotes the peak molecular weight Mp of the crystalline material C is designated as MpC, the toner particle preferably contains a crystalline material C which satisfies formulae (4) and (5) below, $$0 < MpC \times \Delta SPCM^2 - MpB \times \Delta SPBM^2 \quad (4)$$

$$800 < MpC \times \Delta SPCM^2 \quad (5)$$

Formula (4) indicates that compatibility between the crystalline material C and the resin M is lower than compatibility between the crystalline material B and the resin M. In addition, formula (5) indicates that compatibility between the crystalline material C and the resin M is low, and that the crystalline material C readily crystallizes after the resin M melts. By satisfying formulae (4) and (5), the crystalline material C readily achieves the effect of promoting recrystallization of the crystalline material B on a fixed image. As a result, a reduction in gloss can be suppressed in a printed image after being left in a high temperature environment.

The value of $MpC \times \Delta SPCM^2 - MpB \times \Delta SPBM^2$ is more preferably 100 or more, and further preferably 150 or more. The upper limit of $MpC \times \Delta SPCM^2 - MpB \times \Delta SPBM^2$ is not particularly limited, but is preferably 600 or less, and further preferably 500 or less. The value of $MpC \times \Delta SPCM^2$ is preferably 900 or more, and more preferably 1000 or more. The upper limit of $MpC \times \Delta SPCM^2$ is not particularly limited, but is preferably 1300 or less, and more preferably 1200 or less.

In addition, when the absolute value of the difference between the SP value of the crystalline material B and the SP value of the crystalline material C is designated as ΔSPBC, it is preferable for the following formula below to be satisfied:

$$0 < \Delta SPCM - \Delta SPBC \quad (6)$$

Formula (6) indicates that structural similarity between the crystalline material B and the crystalline material C is higher than structural similarity between the crystalline material C and the resin M. In such a case, the crystalline material C readily undergoes recrystallization, and is more compatible than the binder resin with the crystalline material B. By containing the crystalline material C above in the toner particle, recrystallization of the crystalline material B is facilitated. Furthermore, if the crystalline material A and the crystalline material B satisfy the relationships mentioned above, recrystallization of the crystalline material A is facilitated. As a result, it is possible to achieve good low-temperature fixability and suppression of a reduction in toner gloss after fixing to a higher degree. The value of ΔSPCM−ΔSPBC is more preferably 0.80 or more, and further preferably 0.90 or more. The upper limit for this value is preferably 1.25 or less, and more preferably 1.10 or less.

In addition, when the absolute value of the difference between the SP value of the crystalline material A and the SP value of the crystalline material C is designated as ΔSPAC, it is preferable for the following formula (7) to be satisfied:

$$0 < \Delta SPAC - \Delta SPBC \quad (7)$$

This means that compatibility between the crystalline material C and the crystalline material B is greater than compatibility between the crystalline material C and the crystalline material A. If formula (7) is satisfied, the effect that the crystalline material C facilitates crystallization of the crystalline material B on a fixed image is enhanced, and the effect that the crystalline material B facilitates crystallization of the crystalline material A on a fixed image is also enhanced. As a result, a reduction in gloss can be suppressed in a printed image after being left in a high temperature environment. The value of ΔSPAC−ΔSPBC is more preferably 0.01 or more, and further preferably 0.02 or more. The upper limit for this value is preferably 0.30 or less, and more preferably 0.12 or less.

Binder Resin and Resin M

The binder resin contains the resin M in an amount of 70 mass % or more relative to a total amount of the binder resin. The resin M is preferably an amorphous resin. The content of the resin M relative to the total amount of the binder resin is more preferably 80 mass % or more, and further preferably 90 mass % or more. The upper limit for this content is not particularly limited, but is preferably 100 mass % or less, more preferably 98 mass % or less, and further preferably 97 mass % or less.

Vinyl-based resins and polyester resins can be given as preferred examples of the binder resin and the resin M that is a primary component thereof. The following resins and polymers can be given as examples of vinyl-based resins, polyester resins and other binder resins. Homopolymers of styrene and substituted products thereof, such as polystyrene and polyvinyltoluene; styrene-based copolymers such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers and styrene-maleic acid ester copolymers; poly(methyl methacrylate), poly(butyl methacrylate), poly(vinyl acetate), polyethylene, polypropylene, poly(vinyl butyral), silicone resins, polyamide resins, epoxy resins, polyacrylic resins, rosins, modified rosins, terpene resins, phenolic resins, aliphatic and alicyclic hydrocarbon resins, and aromatic petroleum resins. These binder resins can be used in isolation, or a mixture thereof.

The binder resin and the resin M preferably contain carboxyl groups, and are more preferably carboxyl group-containing vinyl-based resins. The binder resin containing carboxyl group can be produced by, for example, using a polymerizable monomer containing carboxyl group in combination with a polymerizable monomer that produces a prescribed binder resin.

Examples of a polymerizable monomers containing carboxyl group include vinyl-based carboxylic acids such as acrylic acid, methacrylic acid, α-ethylacrylic acid and crotonic acid; unsaturated dicarboxylic acids such as fumaric acid, maleic acid, citraconic acid and itaconic acid; and monoester derivatives of unsaturated dicarboxylic acids, such as monoacryloyloxyethyl ester succinate, monomethacryloyloxyethyl ester succinate, monoacryloyloxyethyl ester phthalate and monomethacryloyloxyethyl ester phthalate.

The following monomers can be used for vinyl-based resin for example. Styrene-based monomers such as styrene and styrene derivatives such as styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene and p-n-dodecylstyrene. Acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate. Methacrylic acid esters such as α-methylene aliphatic monocarboxylic acid esters, such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate.

Of these, the resin M is preferably a vinyl-based resin, and is more preferably a polymer of monomers containing styrene and at least one selected from the group consisting of acrylic acid esters and methacrylic acid esters. The vinyl-based resin is a polymer or copolymer of a compound containing a group having an ethylenically unsaturated bond such as a vinyl bond. Examples of groups having an ethylenically unsaturated bond include vinyl groups, (meth)allyl groups and (meth)acryloyl groups.

The binder resin preferably contains other resins mentioned above as a binder resin in addition to the resin M. As for other resins, the binder resin preferably contains at least one selected from the group consisting of amorphous polyester resins and polystyrene. The content of other resins in the binder resin is preferably 2 mass % to 30 mass %, more preferably 2 mass % to 20 mass %, and further preferably 3 mass % to 10 mass %.

Resins obtained through condensation polymerization of carboxylic acid components and alcohol components listed below can be used as the polyester resin. Examples of the carboxylic acid component include terephthalic acid, isophthalic acid, phthalic acid, fumaric acid, maleic acid, cyclohexanedicarboxylic acid and trimellitic acid. Examples of the alcohol component include bisphenol A, hydrogenated bisphenols, ethylene oxide adducts of bisphenol A, propylene oxide adducts of bisphenol A, glycerin, trimethylolpropane and pentaerythritol.

In addition, the polyester resin may be a polyester resin containing urea group. As a polyester resin, it is preferable not to cap the carboxyl groups at a terminal or the like. In order to improve the viscosity change of a toner at high temperatures, the binder resin and the resin M may have a polymerizable functional group. Examples of polymerizable functional groups include vinyl groups, isocyanate groups, epoxy groups, amino groups, carboxyl groups and hydroxyl groups.

The weight average molecular weight Mw of the resin M is preferably from 20,000 to 40,000, and more preferably from 25,000 to 35,000.

Crosslinking Agent

A crosslinking agent may be added when the polymerizable monomer is polymerized in order to control the molecular weight of the binder resin that constitutes the toner particle. The resin M is more preferably a polymer of a styrene, a crosslinking agent and at least one selected from the group consisting of an acrylic acid ester and a methacrylic acid ester.

Examples of crosslinking agents include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinylbenzene, bis(4-acryloxypolyethoxyphenyl)propane, ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate, diethylene glycol diacrylate, triethylene glycol diacrylate, tetraethylene glycol diacrylate, polyethylene glycol #200, #400 and #600 diacrylates, dipropylene glycol diacrylate, polypropylene glycol diacrylate, polyester type diacrylates (MANDA available from Nippon Kayaku Co., Ltd.) and compounds obtained by replacing the acrylates mentioned above with methacrylates. The added amount of the cross-linking agent is preferably from 0.001 parts by mass to 15.000 parts by mass relative to 100 parts by mass of polymerizable monomer.

Crystalline Material A

An explanation will now be given of the crystalline material A. The crystalline material A is not particularly limited as long as formulae (1) to (3) above are satisfied, and in addition to well-known waxes, well-known crystalline resins such as crystalline polyester, crystalline vinyl resins, crystalline polyurethane and crystalline polyurea can be used.

The crystalline material A has a melting point of 50.0° C. to 100.0° C. If the melting point of the crystalline material A falls within the range mentioned above, the toner can achieve low-temperature fixability and storability. If the crystalline material A has a melting point of 50.0° C. or higher, storability of a fixed image at high temperatures is improved. In addition, if the crystalline material A has a melting point of 100.0° C. or lower, it is possible to achieve satisfactory low-temperature fixability. The crystalline material A preferably has a melting point of 60.0° C. to 100.0° C., more preferably from 60.0° C. to 90.0° C., and further preferably from 63.0° C. to 85.0° C. The melting point of the crystalline material A can be controlled through selection of constituent materials of the crystalline material A. A method for measuring the melting point of the crystalline material A is described below.

The crystalline material A is preferably such that the peak molecular weight (Mp) of o-dichlorobenzene soluble components is from 400 to 2000, as measured using high temperature gel permeation chromatography (GPC). If this peak molecular weight (Mp) is 400 or more, toner storability is unlikely to deteriorate. In addition, if this peak molecular weight is 2000 or less, plasticity of the binder resin increases and low-temperature fixability is further improved. This peak molecular weight is more preferably from 500 to 1000, and further preferably from 500 to 800. A method for measuring the peak molecular weight of the crystalline material A is described below.

From the perspective of compatibility with the binder resin, the crystalline material A must be selected within a range that satisfies formula (2). Preferred materials vary depending on the type of resin M used, but waxes are preferred because of its wide range of material choices.

Specific examples of waxes include monofunctional ester waxes such as behenyl behenate, stearyl stearate and palmityl palmitate; difunctional ester waxes such as dibehenyl sebacate and hexane diol dibehenate; trifunctional ester waxes such as glycerol tribehenate; tetrafunctional ester waxes such as pentaerythritol tetrastearate and pentaerythritol tetrapalmitate; hexafunctional ester waxes such as dipentaerythritol hexastearate and dipentaerythritol hexapalmitate; polyfunctional ester waxes such as polyglycerol behenate; natural ester waxes such as carnauba wax and rice wax; petroleum-based waxes and derivatives thereof, such as paraffin waxes, microcrystalline waxes and petrolatum; hydrocarbon waxes obtained using the Fischer Tropsch method and derivatives thereof; polyolefin waxes and derivatives thereof, such as polyethylene waxes and polypropylene waxes; higher aliphatic alcohols; fatty acids such as stearic acid and palmitic acid; and acid amide waxes.

Of these, ester waxes, which are condensates of alcohol components and carboxylic acid components, are preferred, and monofunctional ester waxes and difunctional ester waxes are particularly preferred. Moreover, of these waxes, it is preferable to contain a difunctional ester wax (a diester) having two ester bonds in the molecular structure.

A difunctional ester wax is an ester of a dihydric alcohol and an aliphatic monocarboxylic acid, or an ester of a dihydric carboxylic acid and an aliphatic monoalcohol.

Specific examples of aliphatic monocarboxylic acids include myristic acid, palmitic acid, stearic acid, arachidic acid, behenic acid, lignoceric acid, cerotic acid, montanic acid, melissic acid, oleic acid, vaccenic acid, linoleic acid and linolenic acid. Specific examples of aliphatic monoalcohols include myristyl alcohol, cetanol, stearyl alcohol, arachidyl alcohol, behenyl alcohol, tetracosanol, hexacosanol, octacosanol and triacontanol.

Specific examples of dihydric carboxylic acids include butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid and terephthalic acid.

Specific examples of dihydric alcohols include ethylene glycol, propylene glycol, 1,3-propane diol, 1,4-butane diol, 1,5-pentane diol, 1,6-hexane diol, 1,10-decane diol, 1,12-dodecane diol, 1,14-tetradecane diol, 1,16-hexadecane diol, 1,18-octadecane diol, 1,20-eicosane diol, 1,30-triacontane diol, diethylene glycol, dipropylene glycol, 2,2,4-trimethyl-1,3-pentane diol, neopentyl glycol, 1,4-cyclohexane dimethanol, spiroglycol, 1,4-phenylene glycol, bisphenol A and hydrogenated bisphenol A.

Furthermore, the crystalline material A is preferably a condensate of an aliphatic diol having from 2 to 10 carbons and an aliphatic monocarboxylic acid having from 14 to 24 carbons (a difunctional ester wax), and is more preferably a condensate of an aliphatic diol having from 2 to 6 carbons and an aliphatic monocarboxylic acid having from 14 to 22 carbons (a difunctional ester wax). Examples of diols having from 2 to 6 carbons include ethylene glycol, diethylene glycol, 1,3-propane diol, 1,4-butane diol and 1,6-hexane diol. Examples of aliphatic monocarboxylic acids having from 14 to 24 carbons include myristic acid, palmitic acid, stearic acid and behenic acid. Furthermore, ethylene glycol distearate, which is an ester of ethylene glycol and stearic acid, is particularly preferred.

The number of carbons in the diol component and the monocarboxylic acid of the ester compound can be determined by analyzing the toner particle by means of pyrolysis GC/MS. If necessary, analysis can be carried out easily by means of derivatization using a methylating agent in advance.

Examples of methods for producing a diester compound include a synthesis method by oxidation reaction, synthesis from a carboxylic acid and a derivative thereof, an ester group introduction reaction as represented by Michael addition reaction, a method using a dehydrating condensation from a carboxylic acid compound and an alcohol compound, a reaction from an acid halide and an alcohol compound, and a transesterification reaction. A catalyst can be used as appropriate.

Examples of preferred catalysts include ordinary acidic or alkaline catalysts used in esterification reactions, such as zinc acetate and titanium compounds. Following an esterification reaction, the target product may be purified by means of recrystallization, distillation, and so on. A typical production example is described below. A method for producing a diester compound used in the present invention is not limited to that described below.

First, an alcohol and a carboxylic acid that serve as raw materials are added to a reaction vessel. For example, an alcohol and a carboxylic acid are mixed at amounts such that the diol:monocarboxylic acid molar ratio is 1:2 or the monoalcohol:dicarboxylic acid molar ratio is 2:1. These ratio may be altered in view of reactivity in a dehydrating condensation reaction and so on. The mixture is heated as appropriate and a dehydrating condensation reaction is carried out. To the crude ester product obtained in the dehydrating condensation reaction, a basic aqueous solution and, as appropriate, an organic solvent are added so that unreacted alcohol and carboxylic acid are deprotonated and separated into an aqueous phase. A diester compound is then obtained by washing with water as appropriate, distilling off the solvent and filtering.

The content of the crystalline material A is preferably from 1 part by mass to 30 parts by mass, more preferably from 5 parts by mass to 25 parts by mass, and further preferably from 10 parts by mass to 20 parts by mass, relative to 100 parts by mass of the binder resin. In addition, the content of the crystalline material A relative to the total amount of crystalline materials is preferably 50 mass % or more, more preferably 55 mass % or more, and further preferably 60 mass % or more. The upper limit of this content is not particularly limited, but is preferably 90 mass % or less, more preferably 85 mass % or less, and further preferably 80 mass % or less.

Crystalline Material B

An explanation will be given of the crystalline material B. The crystalline material B is not particularly limited as long as formulae (1) and (3) above are satisfied, and in addition to well-known waxes, well-known crystalline resins such as crystalline polyester, crystalline vinyl resins, crystalline polyurethane and crystalline polyurea can be used. Preferred materials vary according to the type of resin M and crystalline material A which are primary components of the binder resin, but should be selected from the perspectives of compatibility with the resin M and structural similarity to the crystalline material A. Specifically, in order to satisfy formulae (1) and (3), a material which has lower compatibility with the resin M than the crystalline material A, and which has high structural similarity to the crystalline material A should be selected.

In a case where the crystalline material A is an ester wax, it is preferable for the crystalline material B to be an ester wax. In addition, the following materials can be given as preferred examples of the material. Esters of monohydric alcohols and aliphatic carboxylic acids, or esters of monohydric carboxylic acids and aliphatic alcohols, such as behenyl behenate, stearyl stearate and palmityl palmitate; and esters of dihydric alcohols and aliphatic carboxylic acids, or esters of dihydric carboxylic acids and aliphatic alcohols, such as dibehenyl sebacate.

Furthermore, the crystalline material B is more preferably a condensate of an aliphatic dicarboxylic acid having from 2 to 10 carbons and an aliphatic monoalcohol having from 14 to 24 carbons (a difunctional ester wax), and is further preferably a condensate of an aliphatic dicarboxylic acid having from 6 to 10 carbons and an aliphatic monoalcohol having from 14 to 22 carbons (a difunctional ester wax).

The crystalline material B preferably has a melting point of 50° C. to 100° C. If the melting point of the crystalline material B falls within the range mentioned above, the toner can easily achieve low-temperature fixability and storability. The crystalline material B more preferably has a melting point of is 60° C. to 100° C., further preferably from 60° C. to 90° C., and further preferably from 70° C. to 85° C. The melting point of the crystalline material B can be controlled through selection of constituent materials of the crystalline material B. A method for measuring the melting point of the crystalline material B is described below.

The crystalline material B is preferably such that the peak molecular weight (Mp) of o-dichlorobenzene soluble components is from 400 to 2000, as measured using high-temperature gel permeation chromatography (GPC). If this peak molecular weight (Mp) is 400 or more, toner storability is unlikely to deteriorate. In addition, if this peak molecular weight (Mp) is 2000 or less, low-temperature fixability is unlikely to deteriorate. This peak molecular weight (Mp) is more preferably from 500 to 1000. A method for measuring the peak molecular weight of the crystalline material B is described below.

The content of the crystalline material B is preferably lower than the content of the crystalline material A. That is, when the content of the crystalline material A in the toner is designated as XA (mass %), and the content of the crystalline material B in the toner is designated as XB (mass %), it is preferable for the following formula (8) to be satisfied:

$$XA-XB>0 \quad (8)$$

This is because while the crystalline material A acts on the resin M that is a primary component of the binder resin, the crystalline material B acts mainly on the crystalline material A. The content of the crystalline material A in the toner is preferably lower than the content of the resin M, and the crystalline material B can achieve a satisfactory effect at a lower amount than the crystalline material A. The XB/XA ratio is more preferably 1/15 to 1/2, and further preferably 1/11 to 3/10.

The content of the crystalline material B is preferably from 0.1 parts by mass to 10 parts by mass, more preferably from 0.5 parts by mass to 6 parts by mass, and further preferably from 1 part by mass to 4 parts by mass, relative to 100 parts by mass of the binder resin. In addition, the ratio of the crystalline material B relative to the total amount of the crystalline material is preferably from 1 mass % to 30 mass %, and more preferably from 5 mass % to 15 mass %.

Crystalline Material C

As mentioned above, the toner preferably further contains a crystalline material C in addition to the crystalline materials A and B. The crystalline material C is characterized by being a material which exhibits low compatibility with the resin M and which exhibits higher compatibility with the crystalline material B than the resin M.

Examples of this type of crystalline material C include petroleum-based waxes and derivatives thereof, such as paraffin waxes, microcrystalline waxes and petrolatum; montan wax and derivatives thereof; hydrocarbon waxes obtained using the Fischer Tropsch method, and derivatives thereof; polyolefin waxes and derivatives thereof, such as polyethylene waxes and polypropylene waxes; natural waxes and derivatives thereof, such as carnauba wax and candelilla wax; higher aliphatic alcohols; fatty acids such as stearic acid and palmitic acid; acid amide waxes; hydrogenated castor oil and derivatives thereof; plant-based waxes; animal-based waxes; tetrafunctional ester waxes such as pentaerythritol tetrastearate, pentaerythritol tetrapalmitate and pentaerythritol tetrabehenate; and hexafunctional ester waxes such as dipentaerythritol hexastearate, dipentaerythritol hexapalmitate and dipentaerythritol hexabehenate.

In particular, the crystalline material C is preferably at least one selected from the group consisting of a hydrocarbon wax, a tetrafunctional ester wax and a hexafunctional ester wax from the perspectives of low compatibility with the resin M and relatively high structural similarity with the crystalline material B.

The crystalline material C preferably has a melting point of 50° C. to 100° C. If the melting point of the crystalline material C falls within the range mentioned above, the toner can achieve low-temperature fixability and storability. If the crystalline material C has a melting point of 50.0° C. or higher, storability of a fixed image at high temperatures is improved. In addition, if the crystalline material C has a melting point of 100.0° C. or lower, it is possible to achieve satisfactory low-temperature fixability. The crystalline material C preferably has a melting point of 60° C. to 100° C., and more preferably from 70.0° C. to 90.0° C. The melting point of the crystalline material C can be controlled through selection of constituent materials of the crystalline material C. A method for measuring the melting point of the crystalline material C is described below.

The crystalline material C is preferably such that the peak molecular weight (Mp) of o-dichlorobenzene soluble components is from 400 to 2000, as measured using high-temperature gel permeation chromatography (GPC). If this peak molecular weight (Mp) is 400 or more, toner storability is unlikely to deteriorate. In addition, if this peak molecular weight (Mp) is 2000 or less, low-temperature fixability is unlikely to deteriorate. This peak molecular weight (Mp) is more preferably from 400 to 1000. A method for measuring the peak molecular weight of the crystalline material C is described below.

The content of the crystalline material C is preferably the same as, or lower than, the content of the crystalline material A. This is because while the crystalline material A acts on the resin M that is a primary component of the binder resin, the crystalline material C acts mainly on the crystalline material B. The content of the crystalline material C in the toner is preferably lower than the content of the resin M, and the crystalline material C can achieve a satisfactory effect at a lower amount than the crystalline material A.

The content of the crystalline material C is preferably from 0.1 parts by mass to 10 parts by mass, more preferably from 0.5 parts by mass to 6 parts by mass, and further preferably from 1 part by mass to 5 parts by mass, relative to 100 parts by mass of the binder resin. In addition, the ratio of the crystalline material C relative to the total amount of the crystalline material is preferably from 1 mass % to 30 mass %, and more preferably from 5 mass % to 30 mass %.

Colorant

The toner may include a colorant. The colorant is not particularly limited, and known colorants can be used.

Examples of yellow pigments include yellow iron oxide and condensed azo compounds such as Navels Yellow, Naphthol Yellow S, Hansa Yellow G, Hansa Yellow 10G, Benzidine Yellow G, Benzidine Yellow GR, Quinoline Yellow Lake, Permanent Yellow NCG, Tartrazine Lake, and the like, isoindolinone compounds, anthraquinone compounds, azo metal complexes, methine compounds, and allylamide compounds. Specific examples are presented hereinbelow.

C. I. Pigment Yellow 12, 13, 14, 15, 17, 62, 74, 83, 93, 94, 95, 109, 110, 111, 128, 129, 147, 155, 168, 180.

Examples of orange pigments are presented below.

Permanent Orange GTR, Pyrazolone Orange, Vulcan Orange, Benzidine Orange G, Indanthrene Brilliant Orange RK, and Indathrene Brilliant Orange GK.

Examples of red pigments include Indian Red, condensation azo compounds such as Permanent Red 4R, Lithol Red, Pyrazolone Red, Watching Red calcium salt, Lake Red C, Lake Red D, Brilliant Carmine 6B, Brilliant Carmine 3B, Eosin Lake, Rhodamine Lake B, Alizarin Lake and the like, diketopyrrolopyrrole compounds, anthraquinone compounds, quinacridone compounds, basic dye lake compounds, naphthol compounds, benzimidazolone compounds, thioindigo compounds, perylene compounds. Specific examples are presented hereinbelow.

C. I. Pigment Red 2, 3, 5, 6, 7, 23, 48:2, 48:3, 48:4, 57:1, 81:1, 122, 144, 146, 166, 169, 177, 184, 185, 202, 206, 220, 221, 254.

Examples of blue pigments include copper phthalocyanine compounds and derivatives thereof such as Alkali Blue Lake, Victoria Blue Lake, Phthalocyanine Blue, metal-free Phthalocyanine Blue, partial Phthalocyanine Blue chloride, Fast Sky Blue, Indathrene Blue BG and the like, anthraquinone compounds, basic dye lake compound and the like. Specific examples are presented hereinbelow.

C. I. Pigment Blue 1, 7, 15, 15:1, 15:2, 15:3, 15:4, 60, 62, 66.

Examples of purple pigments include Fast Violet B and Methyl Violet Lake. Examples of green pigments include Pigment Green B, Malachite Green Lake. Examples of white pigments include zinc white, titanium oxide, antimony white and zinc sulfide.

Examples of black pigments include carbon black, aniline black, non-magnetic ferrites, magnetite, and those which are colored black by using the abovementioned yellow colorant, red colorant and blue colorant. These colorants can be used singly or in a mixture, or in the form of a solid solution. In addition, surface modification may, if necessary, be carried out by surface treating a colorant with a substance that does not inhibit polymerization. The amount of the colorant is preferably from 3.0 parts by mass to 20.0 parts by mass with respect to 100.0 parts by mass of the binder resin or the polymerizable monomer that produces the binder resin.

Charge Control Agent

The toner particle may contain a charge control agent. A known charge control agent may be used as this charge control agent. A charge control agent which has a fast charging speed and can stably maintain a certain charge quantity is particularly preferred. Furthermore, in a case where the toner particle is produced using a direct polymerization method, a charge control agent which exhibits low polymerization inhibition properties and which is substantially insoluble in an aqueous medium is particularly preferred. Examples of charge control agents that impart the toner particle with negative chargeability include the compounds listed below.

Examples of organometallic compounds and chelate compounds include monoazo metal compounds, acetylacetone metal compounds, aromatic oxycarboxylic acids, aromatic dicarboxylic acids, and oxycarboxylic acid-based and dicarboxylic acid-based metal compounds. In addition, aromatic oxycarboxylic acids, aromatic monocarboxylic acids and polycarboxylic acids and its metal salts and anhydrides, phenol derivatives such as esters and bisphenols and the like, are also included. Further examples include urea derivatives, metal-containing salicylic acid-based compounds, metal-containing naphthoic acid-based compounds, boron compounds, quaternary ammonium salts and calixarene.

Meanwhile, examples of charge control agents that impart the toner particle with positive chargeability include the compounds listed below. Products modified by means of nigrosine and fatty acid metal salts; guanidine compounds; imidazole compounds; quaternary ammonium salts such as tributylbenzyl ammonium-1-hydroxy-4-naphthosulfonic acid salts, tetrabutyl ammonium tetrafluoroborate, and analogs thereof; onium salts such as phosphonium salts, and lake pigments thereof; triphenylmethane dyes and Lake pigments thereof (examples of laking agents include phosphotungstic acid, phosphomolybdic acid, phosphotungstic-molybdic acid, tannic acid, lauric acid, gallic acid, ferricyanic acid and ferrocyanic compounds); metal salts of higher fatty acids; and resin-based charge control agents.

A single one of these charge control agents may be incorporated or a combination of two or more may be incorporated. The amount of charge control agent addition is preferably from 0.01 parts by mass to 10.0 parts by mass per 100 parts by mass of the binder resin.

External Additive

The toner particle may be used as-is as a toner. In order to improve fluidity, challenging performance, cleaning properties, and so on, a toner may be obtained by adding a fluidizing agent, a cleaning aid, or the like, which are so-called external additives, to the toner particle.

Examples of external additives include inorganic oxide fine particles such as silica fine particles, alumina fine particles, titanium oxide fine particles, and the like; fine particles of inorganic stearic acid compounds, such as aluminum stearate fine particles and zinc stearate fine particles; and fine particles of inorganic titanate compounds such as strontium titanate and zinc titanate. It is possible to use one of these external additives in isolation or a combination of two or more types thereof.

These inorganic fine particles are preferably subjected to a gloss treatment using a silane coupling agent, a titanium coupling agent, a higher fatty acid, a silicone oil, or the like in order to improve heat-resistant storability and improve environmental stability. The BET specific surface area of an external additive is preferably from 10 $m^2/g$ to 450 $m^2/g$.

The BET specific surface area can be determined by means of a low temperature gas adsorption method using a dynamic constant pressure method in accordance with a BET method (and preferably a BET multipoint method). For example, BET specific surface area ($m^2/g$) can be calculated by causing nitrogen gas to adsorb to the surface of a sample using a specific surface area measurement apparatus (a Gemini 2375 Ver. 5.0 produced by Shimadzu Corporation) and carrying out measurements using a BET multipoint method.

The total added amount of these external additives is preferably from 0.05 parts by mass to 5 parts by mass, and more preferably from 0.1 parts by mass to 3 parts by mass, relative to 100 parts by mass of toner particles. In addition, a combination of various external additives may be used.

In order to further increase the storability of a fixed image, the toner preferably contains a fatty acid metal salt as an external additive. In a case where a fatty acid metal salt is used as an external additive, the storability of a fixed image tends to be further improved. It is surmised that this is because the fatty acid metal salt acts as a crystal nucleating agent for the crystalline materials at the surface of the image after fixing, thereby increasing the crystallinity of the crystalline materials at the surface of the image.

The fatty acid metal salt is preferably a salt of a fatty acid and at least one metal selected from the group consisting of zinc, calcium, magnesium, aluminum and lithium. Of these, zinc fatty acid particles are particularly preferred from the perspective of suppressing water absorption. In addition, the fatty acid in the fatty acid metal salt is preferably a higher fatty acid having from 12 to 22 carbons (and more preferably from 16 to 20 carbons). If a fatty acid having 12 or more carbons is used, generation of free fatty acid is readily suppressed. The amount of free fatty acid is preferably 0.20 mass % or less. If the number of carbons in the fatty acid is 22 or less, the melting point of the fatty acid metal salt is not excessively high and good fixing performance can be easily achieved. Stearic acid is particularly preferred as the fatty acid.

Examples of fatty acid metal salts include metal salts of stearic acid, such as zinc stearate, calcium stearate, magnesium stearate, aluminum stearate and lithium stearate, and zinc laurate. Of these, use of zinc stearate particles is more preferred for the reasons described above. The added amount of the fatty acid metal salt to the toner (the content of the fatty acid metal salt) is preferably from 0.01 parts by mass to 3.0 parts by mass, and more preferably from 0.03 parts by mass to 0.5 parts by mass, relative to 100 parts by mass of the toner particle. If the added amount is 0.01 parts by mass or more, the effect of adding is achieved. In addition, if the added amount is 3.0 parts by mass or less, the image quality is less likely to deteriorate due to reduced toner fluidity.

The volume-based median diameter (D50s) of the fatty acid metal salt is preferably from 0.15 μm to 1.5 μm, and more preferably from 0.30 μm to 1.5 μm.

Measurement of Median Diameter of Fatty Acid Metal Salt

The volume-based median diameter of the fatty acid metal salt used in the present invention is measured in accordance with JIS Z 8825-1 (2001), but more specifically is measured as follows. A laser diffraction/scattering type particle size distribution measurement apparatus (LA-920 produced by Horiba, Ltd.) is used as the measurement apparatus. Settings for measurement conditions and analysis of measured data are carried out using dedicated software for the LA-920 apparatus (HORIBA LA-920 for Windows (registered trademark) WET (LA-920) Ver. 2.02). In addition, ion exchanged water from which solid impurities and the like have been removed in advance is used as a measurement solvent.

The measurement procedure is as follows.

(1) A batch type cell holder is attached to the LA-920.

(2) A prescribed amount of ion exchanged water is placed in a batch type cell, and the batch type cell is set on the batch type cell holder.

(3) The contents of the batch type cell are stirred using a dedicated stirrer chip.

(4) The "Refractive index" button on the "Display condition setting" screen is pushed, and the file "110A000I" (Relative refractive index 1.10) is selected.

(5) Particle diameter basis is set to volume-based on the "Display condition setting" screen.

(6) After warming up for 1 hour or more, the optical axis is adjusted and then microadjusted, and blank measurements are carried out.

(7) Approximately 60 mL of ion exchanged water is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.

(8) An ultrasonic wave disperser "Ultrasonic Dispersion System Tetra 150 (produced by Nikkaki Bios Co., Ltd.)" having an electrical output of 120 W, in which two oscillators having an oscillation frequency of 50 kHz are housed so that their phases are staggered by 180° is prepared. Approximately 3.3 L of ion exchanged water is placed in a water bath in the ultrasonic dispersion system, and approximately 2 mL of Contaminon N is added to this water bath.

(9) The beaker mentioned in step (7) above is placed in a beaker-fixing hole in the ultrasonic wave disperser, and the ultrasonic wave disperser is activated. The height of the beaker is adjusted so that the resonant state of the liquid surface of the aqueous solution in the beaker is at a maximum.

(10) While the aqueous solution in the beaker mentioned in step (9) above is being irradiated with ultrasonic waves, approximately 1 mg of a fatty acid metal salt is added a little at a time to the aqueous solution in the beaker and dispersed therein. The ultrasonic wave dispersion treatment is continued for a further 60 seconds. The fatty acid metal salt may, in some cases, form lumps and float on the liquid surface, but in such a case, ultrasonic dispersion is carried out for 60 seconds after the lumps are submerged in the water by shaking the beaker. In addition, when carrying out the ultrasonic wave dispersion, the temperature of the water bath is adjusted as appropriate to a temperature of from 10° C. to 40° C.

(11) The fatty acid metal salt-dispersed aqueous solution prepared in step (10) above is immediately added a little at a time to the batch type cell while taking care to avoid introducing bubbles, and adjusted so that the transmittance of a tungsten lamp is 90% to 95%. In addition, the particle size distribution is measured. The 50% cumulative diameter is calculated from data of the obtained volume-based particle size distribution.

Developer

The toner can be used as a magnetic or non-magnetic one-component developer, but it may be also mixed with a carrier and used as a two-component developer.

As the carrier, magnetic particles composed of conventionally known materials such as metals such as iron, ferrites, magnetite and alloys of these metals with metals such as aluminum and lead can be used. Among them, ferrite particles are preferable. Further, a coated carrier obtained by coating the surface of magnetic particles with a coating agent such as a resin, a resin dispersion type carrier obtained by dispersing magnetic fine powder in a binder resin, or the like may be used as the carrier.

The volume average particle diameter of the carrier is preferably from 15 μm to 100 μm, and more preferably from 25 μm to 80 μm.

Method for Producing Toner Particle

The toner particle can be produced using a well-known production method, such as a pulverization method, a suspension polymerization method, an emulsion aggregation method or a dissolution suspension method, and this production method is not particularly limited. This toner production method is not particularly limited, but a method that includes either step (i) or (ii) below is preferred.

(i) A step for forming the particles of a polymerizable monomer composition in an aqueous medium, wherein the particles contain a polymerizable monomer which can form a binder resin containing a styrene-acrylic copolymer that is the resin M; the crystalline material A; the crystalline material B; and, if necessary, other additives such as the crystalline material C, and then polymerizing the polymerizable monomer contained in the particles of the polymerizable monomer composition (a suspension polymerization method).

(ii) A step for forming the particles of a resin solution in an aqueous medium, wherein the particles are obtained by dissolving or dispersing a binder resin that contains a styrene-acrylic copolymer that is the resin M; the crystalline material A; the crystalline material B; and, if necessary, other additives such as the crystalline material C, and then removing the organic solvent contained in the particles of the resin solution (a dissolution suspension method).

Amorphous Polyester Resin

The binder resin preferably contains an amorphous polyester resin in addition to the resin M. The content of the amorphous polyester resin in the binder resin is preferably from 1.0 mass % to 10.0 mass %, and more preferably from 2.0 mass % to 8.0 mass %.

A well-known polyester resin can be used as the amorphous polyester resin. Specific examples thereof include a method comprising performing dehydrating condensation on a dibasic acid or a derivative thereof (a carboxylic acid halide, ester or anhydride) and a dihydric alcohol as essential components and, if necessary, a trihydric or higher polybasic acid and a derivative thereof (a carboxylic acid halide, ester or anhydride), a monobasic acid, a trihydric or higher alcohol, a monohydric alcohol, or the like.

Examples of dibasic acids include aliphatic dibasic acids such as maleic acid, fumaric acid, itaconic acid, oxalic acid, malonic acid, succinic acid, dodecylsuccinic acid, dodecenylsuccinic acid, adipic acid, azelaic acid, sebacic acid, and decane-1,10-dicarboxylic acid; and aromatic dibasic acids such as phthalic acid, tetrahydrophthalic acid, hexahydrophthalic acid, tetrabromophthalic acid, tetrachlorophthalic acid, HET acid, himic acid, isophthalic acid, terephthalic acid and 2,6-naphthalenedicarboxylic acid. In addition, examples of dibasic acid derivatives include carboxylic acid halides, esters and anhydrides of aliphatic dibasic acid and aromatic dibasic acids.

Examples of dihydric alcohols include acyclic aliphatic diols such as ethylene glycol, 1,2-propane diol, 1,3-propane diol, 1,4-butane diol, 1,5-pentane diol, 1,6-hexane diol, diethylene glycol, dipropylene glycol, triethylene glycol and neopentyl glycol; bisphenol compounds such as bisphenol A and bisphenol F; alkylene oxide adducts of bisphenol A, such as ethylene oxide adducts of bisphenol A and propylene oxide adducts of bisphenol A; and aralkylene glycol compounds such as xylylene diglycol. Examples of trihydric or higher polybasic acids and anhydrides thereof include trimellitic acid, trimellitic anhydride, pyromellitic acid and pyromellitic anhydride.

Methods for Measuring Peak Molecular Weight (Mp) and Weight Average Molecular Weight (Mw)

The peak molecular weight (Mp) and weight average molecular weight (Mw) of the crystalline materials, the resins and the toner are measured using gel permeation chromatography (GPC), in the manner described below. First, a sample to be measured is dissolved in tetrahydrofuran (THF) at room temperature. If the sample is difficult to dissolve, the sample is heated at a temperature of 35° C. or lower. A sample solution is then obtained by filtering the obtained solution using a solvent-resistant membrane filter having a pore diameter of 0.2 μm (a "Mishoridisk" produced by Tosoh Corporation). The sample solution is adjusted so that the concentration of THF-soluble components is 0.8 mass %. Measurements are carried out using this sample solution under the following conditions.

Apparatus: High speed GPC apparatus (HLC-8220GPC produced by Tosoh Corporation)

Column: Two LF-604 connected in series (produced by Showa Denko Kabushiki Kaisha)

Eluant: THF

Flow rate: 0.6 mL/min

Oven temperature: 40° C.

Injected amount: 0.020 mL

To calculate the molecular weight of the sample, a molecular weight calibration curve is prepared using standard polystyrene resins (product names "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Method for Measuring Melting Point

The melting point of crystalline materials (crystalline resins or waxes) is measured under the following conditions using a differential scanning calorimeter (DSC) (Q2000 produced by TA Instruments).

Temperature increase rate: 10° C./min

Measurement start temperature: 20° C.

Measurement end temperature: 180° C.

The melting points of indium and zinc are used for temperature calibration of the device detection unit, and the melting heat of indium is used for correction heat quantity. Specifically, approximately 5 mg of a sample is weighed out, placed in an aluminum pan, and one measurement is carried out. An empty aluminum pan is used as a reference. Here, the peak temperature of the maximum endothermic peak is taken to be the melting point.

Measurement of Glass Transition Temperature (Tg)

The glass transition temperature of an amorphous resin is the temperature (° C.) at the intersection point of the straight line equidistant in the vertical direction from the line extending the baseline before and after the specific heat change and the curve of the staircase change part of the glass transition in the reversing heat flow curve which is obtained by differential scanning calorimetry in the above melting point measurement method during temperature rise.

Specifying Structure and Analyzing Peak Molecular Weight of Resin M and Crystalline Material in Toner, and Analyzing Melting Point of Crystalline Material in Toner Specifying the structure and analyzing the composition of the crystalline materials and the resin M in the toner can be carried out using a nuclear magnetic resonance apparatus ($^{1}$H-NMR and $^{13}$C-NMR). Details of the apparatus for use is described below. A sample may be taken from the toner by isolating, and then analyzed.

Nuclear magnetic resonance apparatus ($^{1}$H-NMR, $^{13}$C-NMR)

Measurement apparatus: FT NMR apparatus (JNM-EX400 available from JEOL Ltd.)

Measurement frequency: 400 MHz

Pulse conditions: 5.0 μs

Frequency range: 10,500 Hz

Number of accumulations: 64

Peak molecular weight and melting point can be calculated from a specified composition or calculated on the basis of values in cited documents.

Measurement of Content of Resin M in Binder Resin in Toner

The content of the resin M in the binder resin in the toner can be calculated by determining molar compositional ratios from signal integration ratios (area ratios) by the NMR measurement. The weight compositional ratio can be calculated by multiplying the molar compositional ratio by the molecular weight of each compound, then the content of the resin M can be determined from the weight compositional ratio.

Measurement of Content of Crystalline Materials A, B and C in Toner

The content of the crystalline materials A, B and C in the toner can be calculated by determining molar compositional ratios from signal integration ratios (area ratios) by the NMR measurement. The weight compositional ratio can be calculated by multiplying the molar compositional ratio by the molecular weight of each compound, then the content of the crystalline materials A, B and C can be determined from the weight compositional ratio.

Method for Measuring Weight-Average Particle Diameter (D4) of Toner

The weight-average particle diameter (D4) of the toner is calculated in the manner described below. A precision particle size distribution measuring apparatus based on a pore electric resistance method with a 100 μm aperture tube (a Coulter Counter Multisizer 3 (registered trademark) produced by Beckman Coulter, Inc.) is used for measurement. Settings for measurement conditions and analysis of measured data are carried out using dedicated software for the measurement apparatus (Beckman Coulter Multisizer 3 Version 3.51 produced by Beckman Coulter, Inc.). The measurements are carried out using 25,000 effective measurement channels. A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis. On the "Standard Operating Method (SOMME) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 μm to 60 The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.

(3) An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 180° is prepared. Approximately 3.3 L of ion exchanged water is placed in a water bath in the ultrasonic dispersion system, and approximately 2 mL of Contaminon N is added to this water bath.

(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight-average particle diameter (D4) is calculated by analyzing measurement data using the accompanying dedicated software. The "average diameter" on the "Analysis/volume-based statistical values (arithmetic mean)" screen is weight-average particle diameter (D4) when the condition is set to graph/vol. % in the dedicated software.

EXAMPLES

The present invention is more specifically described herebelow using examples. The present invention is not limited by the examples that follow.

The number of parts in the following examples are on a mass basis in all instances unless specifically indicated otherwise.

Names and physical properties of the resin M and crystalline materials used in the examples and comparative examples are shown in Table 1 and Table 2.

TABLE 1

| Resin M | Composition | Mw | SPm |
|---|---|---|---|
| Resin M1 | Styrene/n-butyl acrylate 75/25 | 30000 | 9.81 |
| Resin M2 | Styrene/isobutyl-acrylate 69/31 | 35000 | 9.73 |
| Resin M3 | Styrene/propyl acrylate 74/26 | 31000 | 9.85 |
| Resin M4 | Styrene/2-ethylhexyl acrylate 85/15 | 32000 | 9.68 |
| Resin M5 | Styrene/tert-butyl acrylate 28/72 | 36000 | 9.48 |
| Resin M6 | Styrene/n-butyl acrylate 75/25 | 35000 | 9.81 |
| Resin M7 | Styrene/n-butyl acrylate 75/25 | 25000 | 9.81 |

In the table,

Mw denotes weight average molecular weight, and SPm denotes value of the solubility parameter (SP value) of the resin M. Units for SP value are $(cal/cm^3)^{1/2}$.

TABLE 2

| Crystalline material | Composition | Tm (° C.) | Mp | SP value |
|---|---|---|---|---|
| Crystalline material 1 | Ethylene glycol dipalmitate | 69.4 | 539 | 8.88 |
| Crystalline material 2 | Ethylene glycol distearate | 75.9 | 595 | 8.85 |
| Crystalline material 3 | Butane diol distearate | 68.4 | 623 | 8.84 |
| Crystalline material 4 | Hexane diol distearate | 63.4 | 651 | 8.83 |
| Crystalline material 5 | Ethylene glycol dibehenate | 82.8 | 707 | 8.81 |
| Crystalline material 6 | Diethylene glycol dibehenate | 72.5 | 751 | 8.83 |
| Crystalline material 7 | Stearyl stearate | 61.8 | 537 | 8.59 |
| Crystalline material 8 | Dibehenyl adipate | 71.5 | 763 | 8.79 |
| Crystalline material 9 | Behenyl stearate | 67 | 593 | 8.59 |
| Crystalline material 10 | Stearyl behenate | 66.8 | 593 | 8.59 |
| Crystalline material 11 | Dibehenyl sebacate | 73.4 | 819 | 8.77 |
| Crystalline material 12 | Behenyl behenate | 72.9 | 649 | 8.59 |
| Crystalline material 13 | Hydrocarbon wax (HNP-51 produced by Nippon Seiro Co., Ltd.) | 77.6 | 469 | 8.28 |
| Crystalline material 14 | Pentaerythritol tetrabehenate | 75.5 | 1426 | 8.87 |
| Crystalline material 15 | Dipentaerythritol hexabehenate | 78.5 | 1853 | 8.97 |

In the table, Tm denotes melting point, and Mp denotes peak molecular weight. Units for SP value are $(cal/cm^3)^{1/2}$.

Toner production examples are described below. Toners 1 to 41 were produced as examples, and Toners 42 to 49 were produced as comparative examples.

Production Example of Amorphous Polyester Resin 1

1.0 mol of terephthalic acid, 0.65 mol of the 2 mol adduct of propylene oxide on bisphenol A and 0.35 mol of ethylene glycol were added to a reaction vessel equipped with a stirring machine, a temperature gauge, a nitrogen inlet tube, a dehydration tube and a depressurization device, and heated to a temperature of 130° C. while being stirred. Tin di(2-ethylhexanoate) was added as an esterification catalyst at an amount of 0.52 parts relative to a total of 100.0 parts of the monomers mentioned above, and the temperature was then increased to 200° C., and condensation polymerization was carried out until a prescribed molecular weight was reached. 0.03 mol of trimellitic anhydride was added and amorphous polyester resin 1 was obtained. The obtained amorphous polyester resin 1 had a weight average molecular weight (Mw) of 6000, a glass transition temperature (Tg) of 49° C., and an acid value of 11.2 mg KOH/g.

Production Example of Toner 1

Styrene: 60.0 parts

Colorant: 6.0 parts (C.I. Pigment Blue 15:3, produced by Dainichiseika Color and Chemicals Mfg. Co., Ltd.)

The materials listed above were placed in an attritor (produced by Mitsui Miike Kakoki Corporation) and then dispersed for 5 hours at 220 rpm using zirconia beads having diameters of 1.7 mm so as to obtain a pigment-dispersed solution.

Styrene: 15.0 parts n-butyl acrylate: 25.0 parts

Amorphous polyester resin 1: 5.0 parts

Crystalline material 2: 15.0 parts

Crystalline material 8: 2.0 parts

Crystalline material 13: 4.0 parts

Hexane diol diacrylate (HDDA): 0.3 parts

The materials listed above were mixed and added to the pigment-dispersed solution. A polymerizable monomer composition was prepared by heating the obtained mixture to 60° C. and stirring at 500 rpm using a T.K. homogenizer (produced by Tokushu Kika Kogyo Co., Ltd.) so as to homogeneously dissolve and disperse the mixture. Meanwhile, 850.0 parts of a 0.10 mol/L aqueous solution of $Na_3PO_4$ and 8.0 parts of 10% hydrochloric acid were added to a vessel fitted with a high speed stirring machine (a Clearmix produced by M Technique Co., Ltd.), and the speed of rotation was adjusted to 15,000 rpm and the temperature was increased to 70° C. An aqueous medium containing a calcium phosphate compound was then continuously prepared by adding 68.0 parts of a 1.0 mol/L aqueous solution of $CaCl_2$).

The polymerizable monomer composition was added to this aqueous medium, after which 9.0 parts of t-butyl peroxypivalate was added as a polymerization initiator, and granulation was carried out for 10 minutes while maintaining a speed of rotation of 15,000 rpm. The stirring machine was changed from the high speed stirring machine to a propeller type stirring blade, a reaction was carried out for 5 hours at 70° C. while refluxing, and further reaction was carried out for 2 hours after which the liquid temperature was increased to 85° C. Following completion of the polymerization reaction, the obtained slurry was cooled, and a part of the slurry was extracted and subjected to particle size distribution measurements. The hydrochloric acid was added to the slurry to adjust the pH thereof to 1.4, and calcium phosphate was dissolved by stirring for 1 hour. The slurry was then washed with an amount of water corresponding to three times the amount of slurry, filtered, dried and classified so as to obtain toner particles containing the resin M1 as a binder resin. The molecular weight distribution of the toner particles was measured, and the weight average molecular weight Mw thereof was calculated to be 30,000.

Toner 1 was obtained by adding 2.0 parts of silica fine particles (having a number average particle diameter of primary particles of 10 nm and a BET specific surface area of 170 $m^2/g$) that had been subjected to a hydrophobic treatment with dimethylsilicone oil (20 mass %) and 0.05 parts of zinc stearate particles (having a volume-based median diameter D50s of 0.3 μm) as external additives to 100.0 parts of the toner particles, and mixing for 15 minutes at 3000 rpm using a Mitsui Henschel mixer (produced by Mitsui Miike Kakoki Corporation).

Examples of Toners 2 to 35

Toners 2 to 35 were obtained in the same way as in the production example of Toner 1, except that the types and added amounts of the crystalline materials A, B and C and the type and added amount of the binder resin M were changed in the manner shown in Table 3.

Production Example of Toner 36

Styrene: 60.0 parts

Colorant: 6.0 parts (C.I. Pigment Blue 15:3, produced by Dainichiseika Color and Chemicals Mfg. Co., Ltd.)

The materials listed above were placed in an attritor (produced by Mitsui Miike Kakoki Corporation) and then dispersed for 5 hours at 220 rpm using zirconia beads having diameters of 1.7 mm so as to obtain a pigment-dispersed solution.

Styrene: 15.0 parts n-butyl acrylate: 25.0 parts

Amorphous polyester resin 1: 5.0 parts

Low molecular weight polystyrene resin: 20.0 parts (Mw=3000, Mn=1050, Tg=55° C.)

Crystalline material 2: 15.0 parts

Crystalline material 11: 2.0 parts

Crystalline material 13: 4.0 parts

Hexane diol diacrylate (HDDA): 0.3 parts

The materials listed above were mixed and added to the pigment-dispersed solution. Thereafter, Toner 36 was obtained in the same way as in the production example of Toner 1.

Production Example of Toner 37

Toner 37 was obtained in the same way as in the production example of Toner 36, except that the added amount of the low molecular weight polystyrene resin was changed to 25.0 parts.

Production Example of Toner 38

Toner 38 was obtained in the same way as in the production example of Toner 36, except that the added amount of the low molecular weight polystyrene resin was changed to 38.0 parts.

Production Example of Toner 39

Toner 39 was obtained in the same way as in the production example of Toner 5, except that 2.0 parts of silica fine particles (having a number average particle diameter of primary particles of 10 nm and a BET specific surface area of 170 $m^2/g$) that had been subjected to a hydrophobic treatment with dimethylsilicone oil (20 mass % of) and 0.5 parts of zinc stearate particles (having a volume-based median diameter D50s of 0.3 μm) were used as external additives.

Production Example of Toner 40

Toner 40 was obtained in the same way as in the production example of Toner 5, except that 2.0 parts of silica fine particles (having a number average particle diameter of primary particles of 10 nm and a BET specific surface area of 170 $m^2/g$) that had been subjected to a hydrophobic treatment with dimethylsilicone oil (20 mass % of) and 0.05 parts of zinc stearate particles (having a volume-based median diameter D50s of 1.5 μm) were used as external additives.

Production Example of Toner 41

Toner 41 was obtained in the same way as in the production example of Toner 5, except that zinc stearate particles were not used as an external additive.

TABLE 3

| Example No. | Toner No. | Resin M No. | Resin M SP value | Crystalline material A No. | Crystalline material A Melting point | Crystalline material A Added amount | Crystalline material B No. | Crystalline material B Added amount | Crystalline material C No. | Crystalline material C Added amount | Amount of M |
|---|---|---|---|---|---|---|---|---|---|---|---|
| 1 | 1 | M1 | 9.81 | 2 | 75.9 | 15 | 8 | 2 | 13 | 4 | 95% |
| 2 | 2 | M1 | 9.81 | 2 | 75.9 | 15 | 9 | 2 | 13 | 4 | 95% |
| 3 | 3 | M1 | 9.81 | 2 | 75.9 | 15 | 10 | 2 | 13 | 4 | 95% |
| 4 | 4 | M1 | 9.81 | 2 | 75.9 | 15 | 12 | 2 | 13 | 4 | 95% |
| 5 | 5 | M1 | 9.81 | 2 | 75.9 | 15 | 11 | 2 | 13 | 4 | 95% |
| 6 | 6 | M1 | 9.81 | 2 | 75.9 | 10 | 11 | 2 | 13 | 4 | 95% |
| 7 | 7 | M1 | 9.81 | 1 | 69.4 | 10 | 11 | 2 | 13 | 4 | 95% |
| 8 | 8 | M1 | 9.81 | 3 | 68.4 | 10 | 11 | 2 | 13 | 4 | 95% |
| 9 | 9 | M1 | 9.81 | 4 | 63.4 | 10 | 11 | 2 | 13 | 4 | 95% |
| 10 | 10 | M1 | 9.81 | 5 | 82.8 | 10 | 11 | 2 | 13 | 4 | 95% |
| 11 | 11 | M1 | 9.81 | 6 | 72.5 | 10 | 11 | 2 | 13 | 4 | 95% |
| 12 | 12 | M1 | 9.81 | 7 | 61.8 | 10 | 11 | 2 | 13 | 4 | 95% |
| 13 | 13 | M1 | 9.81 | 4 | 63.4 | 10 | 12 | 2 | 13 | 4 | 95% |
| 14 | 14 | M1 | 9.81 | 7 | 61.8 | 10 | 12 | 2 | 13 | 4 | 95% |
| 15 | 15 | M1 | 9.81 | 4 | 63.4 | 10 | 9 | 2 | 13 | 4 | 95% |
| 16 | 16 | M1 | 9.81 | 7 | 61.8 | 10 | 9 | 2 | 13 | 4 | 95% |
| 17 | 17 | M1 | 9.81 | 2 | 75.9 | 10 | 4 | 2 | 13 | 4 | 95% |
| 18 | 18 | M1 | 9.81 | 2 | 75.9 | 10 | 7 | 2 | 13 | 4 | 95% |
| 19 | 19 | M1 | 9.81 | 2 | 75.9 | 10 | 12 | 2 | — | — | 95% |
| 20 | 20 | M1 | 9.81 | 7 | 61.8 | 10 | 12 | 2 | — | — | 95% |
| 21 | 21 | M1 | 9.81 | 2 | 75.9 | 10 | 11 | 2 | 13 | 4 | 95% |
| 22 | 22 | M1 | 9.81 | 2 | 75.9 | 10 | 11 | 2 | 14 | 4 | 95% |
| 23 | 23 | M1 | 9.81 | 2 | 75.9 | 10 | 11 | 2 | 15 | 4 | 95% |
| 24 | 24 | M1 | 9.81 | 2 | 75.9 | 10 | 11 | 6 | 13 | 4 | 95% |
| 25 | 25 | M1 | 9.81 | 2 | 75.9 | 10 | 11 | 4 | 13 | 4 | 95% |
| 26 | 26 | M1 | 9.81 | 2 | 75.9 | 10 | 11 | 1 | 13 | 4 | 95% |
| 27 | 27 | M1 | 9.81 | 2 | 75.9 | 10 | 11 | 1 | 13 | 2 | 95% |
| 28 | 28 | M1 | 9.81 | 2 | 75.9 | 10 | 11 | 1 | 13 | 1 | 95% |
| 29 | 29 | M1 | 9.81 | 2 | 75.9 | 5 | 11 | 1 | 13 | 2 | 95% |
| 30 | 30 | M1 | 9.73 | 2 | 75.9 | 15 | 11 | 2 | 13 | 4 | 95% |
| 31 | 31 | M1 | 9.85 | 2 | 75.9 | 15 | 11 | 2 | 13 | 4 | 95% |
| 32 | 32 | M1 | 9.68 | 2 | 75.9 | 15 | 11 | 2 | 13 | 4 | 95% |
| 33 | 33 | M1 | 9.48 | 2 | 75.9 | 15 | 11 | 2 | 13 | 4 | 95% |
| 34 | 34 | M1 | 9.81 | 2 | 75.9 | 15 | 11 | 2 | 13 | 4 | 95% |
| 35 | 35 | M1 | 9.81 | 2 | 75.9 | 15 | 11 | 2 | 13 | 4 | 95% |
| 36 | 36 | M1 | 9.81 | 2 | 75.9 | 15 | 11 | 2 | 13 | 4 | 80% |
| 37 | 37 | M1 | 9.81 | 2 | 75.9 | 15 | 11 | 2 | 13 | 4 | 77% |
| 38 | 38 | M1 | 9.81 | 2 | 75.9 | 15 | 11 | 2 | 13 | 4 | 70% |
| 39 | 39 | M1 | 9.81 | 2 | 75.9 | 15 | 11 | 2 | 13 | 4 | 95% |
| 40 | 40 | M1 | 9.81 | 2 | 75.9 | 15 | 11 | 2 | 13 | 4 | 95% |
| 41 | 41 | M1 | 9.81 | 2 | 75.9 | 15 | 11 | 2 | 13 | 4 | 95% |
| Comparative 1 | 42 | M1 | 9.81 | 2 | 75.9 | 15 | 13 | 4 | — | — | 95% |
| Comparative 2 | 43 | M1 | 9.81 | 2 | 75.9 | 15 | 15 | 4 | — | — | 95% |
| Comparative 3 | 44 | M1 | 9.81 | 1 | 69.4 | 15 | 12 | 2 | — | — | 95% |
| Comparative 4 | 45 | M1 | 9.81 | 12 | 72.9 | 5 | 13 | 1 | — | — | 95% |
| Comparative 5 | 46 | M1 | 9.81 | 7 | 61.8 | 10 | 14 | 2 | — | — | 95% |
| Comparative 6 | 47 | M1 | 9.81 | 7 | 61.8 | 10 | 15 | 2 | — | — | 95% |
| Comparative 7 | 48 | M1 | 9.81 | 3 | 68.4 | 10 | 4 | 2 | 13 | 4 | 95% |
| Comparative 8 | 49 | M1 | 9.81 | 1 | 69.4 | 15 | 10 | 2 | 13 | 4 | 95% |

| Example No. | (A) MpA × $\Delta SPAM^2$ | (B) MpB × $\Delta SPBM^2$ | (B) − (A) | ΔSPAB | ΔSPCM − ΔSPBC | (C) MpC × $\Delta SPCM^2$ | ΔSPAC − ΔSPBC | (C) − (B) |
|---|---|---|---|---|---|---|---|---|
| 1 | 548 | 794 | 245 | 0.06 | 1.02 | 1098 | 0.06 | 304 |
| 2 | 548 | 883 | 334 | 0.26 | 1.22 | 1098 | 0.26 | 215 |
| 3 | 548 | 883 | 334 | 0.26 | 1.22 | 1098 | 0.26 | 215 |
| 4 | 548 | 966 | 418 | 0.26 | 1.22 | 1098 | 0.26 | 132 |
| 5 | 548 | 886 | 337 | 0.08 | 1.04 | 1098 | 0.08 | 212 |
| 6 | 548 | 886 | 337 | 0.08 | 1.04 | 1098 | 0.08 | 212 |
| 7 | 466 | 886 | 420 | 0.11 | 1.04 | 1098 | 0.11 | 212 |
| 8 | 586 | 886 | 300 | 0.07 | 1.04 | 1098 | 0.07 | 212 |
| 9 | 625 | 886 | 261 | 0.06 | 1.04 | 1098 | 0.06 | 212 |
| 10 | 707 | 886 | 179 | 0.04 | 1.04 | 1098 | 0.04 | 212 |
| 11 | 721 | 886 | 165 | 0.06 | 1.04 | 1098 | 0.06 | 212 |
| 12 | 799 | 886 | 87 | 0.18 | 1.04 | 1098 | −0.18 | 212 |
| 13 | 625 | 966 | 341 | 0.24 | 1.22 | 1098 | 0.24 | 132 |
| 14 | 799 | 966 | 167 | 0.00 | 1.22 | 1098 | 0 | 132 |
| 15 | 625 | 883 | 257 | 0.24 | 1.22 | 1098 | 0.24 | 215 |
| 16 | 799 | 883 | 83 | 0.00 | 1.22 | 1098 | 0 | 215 |
| 17 | 548 | 625 | 77 | 0.02 | 0.98 | 1098 | 0.02 | 473 |
| 18 | 548 | 799 | 251 | 0.26 | 1.22 | 1098 | 0.26 | 299 |
| 19 | 548 | 966 | 418 | 0.26 | — | — | — | — |
| 20 | 799 | 966 | 167 | 0.00 | — | — | — | — |
| 21 | 548 | 886 | 337 | 0.08 | 1.04 | 1098 | 0.08 | 212 |

TABLE 3-continued

| | | | | | | | | |
|---|---|---|---|---|---|---|---|---|
| 22 | 548 | 886 | 337 | 0.08 | 0.84 | 1260 | −0.08 | 374 |
| 23 | 548 | 886 | 337 | 0.08 | 0.64 | 1307 | −0.08 | 422 |
| 24 | 548 | 886 | 337 | 0.08 | 1.04 | 1098 | 0.08 | 212 |
| 25 | 548 | 886 | 337 | 0.08 | 1.04 | 1098 | 0.08 | 212 |
| 26 | 548 | 886 | 337 | 0.08 | 1.04 | 1098 | 0.08 | 212 |
| 27 | 548 | 886 | 337 | 0.08 | 1.04 | 1098 | 0.08 | 212 |
| 28 | 548 | 886 | 337 | 0.08 | 1.04 | 1098 | 0.08 | 212 |
| 29 | 548 | 886 | 337 | 0.08 | 1.04 | 1098 | 0.08 | 212 |
| 30 | 461 | 755 | 294 | 0.08 | 0.96 | 986 | 0.08 | 231 |
| 31 | 595 | 955 | 360 | 0.08 | 1.08 | 1156 | 0.08 | 201 |
| 32 | 410 | 678 | 268 | 0.08 | 0.91 | 919 | 0.08 | 241 |
| 33 | 236 | 413 | 177 | 0.08 | 0.71 | 675 | 0.08 | 263 |
| 34 | 548 | 886 | 337 | 0.08 | 1.04 | 1098 | 0.08 | 212 |
| 35 | 548 | 886 | 337 | 0.08 | 1.04 | 1098 | 0.08 | 212 |
| 36 | 548 | 886 | 337 | 0.08 | 1.04 | 1098 | 0.08 | 212 |
| 37 | 548 | 886 | 337 | 0.08 | 1.04 | 1098 | 0.08 | 212 |
| 38 | 548 | 886 | 337 | 0.08 | 1.04 | 1098 | 0.08 | 212 |
| 39 | 548 | 886 | 337 | 0.08 | 1.04 | 1098 | 0.08 | 212 |
| 40 | 548 | 886 | 337 | 0.08 | 1.04 | 1098 | 0.08 | 212 |
| 41 | 548 | 886 | 337 | 0.08 | 1.04 | 1098 | 0.08 | 212 |
| Comparative 1 | 548 | 1098 | 550 | 0.57 | — | — | — | — |
| Comparative 2 | 548 | 1307 | 759 | 0.12 | — | — | — | — |
| Comparative 3 | 466 | 966 | 500 | 0.29 | — | — | — | — |
| Comparative 4 | 966 | 1098 | 132 | 0.31 | — | — | — | — |
| Comparative 5 | 799 | 1260 | 461 | 0.28 | — | — | — | — |
| Comparative 6 | 799 | 1307 | 508 | 0.38 | — | — | — | — |
| Comparative 7 | 586 | 625 | 39 | 0.01 | 0.98 | 1098 | 0.01 | 473 |
| Comparative 8 | 466 | 883 | 416 | 0.29 | 1.22 | 1098 | 0.29 | 215 |

In the table, "Amount of M" denotes the content (mass %) of the resin M in the binder resin.

Production Examples of Toners 42 to 49

Toners 42 to 49 were obtained in the same way as in the production example of Toner 1, except that the types and added amounts of the crystalline materials A, B and C and the type and added amount of the binder resin M were changed in the manner shown in Table 3.

The ratio (mass %) of the crystalline materials A, B and C relative to the total amount of crystalline materials in Toners 1 to 49 are summarized in Table 4.

TABLE 4

| | Toner | Ratio relative to total amount of crystalline materials | | |
|---|---|---|---|---|
| | | Crystalline material A | Crystalline material B | Crystalline material C |
| Example 1 | Toner 1 | 71% | 10% | 19% |
| Example 2 | Toner 2 | 71% | 10% | 19% |
| Example 3 | Toner 3 | 71% | 10% | 19% |
| Example 4 | Toner 4 | 71% | 10% | 19% |
| Example 5 | Toner 5 | 71% | 10% | 19% |
| Example 6 | Toner 6 | 63% | 13% | 25% |
| Example 7 | Toner 7 | 63% | 13% | 25% |
| Example 8 | Toner 8 | 63% | 13% | 25% |
| Example 9 | Toner 9 | 63% | 13% | 25% |
| Example 10 | Toner 10 | 63% | 13% | 25% |
| Example 11 | Toner 11 | 63% | 13% | 25% |
| Example 12 | Toner 12 | 63% | 13% | 25% |
| Example 13 | Toner 13 | 63% | 13% | 25% |
| Example 14 | Toner 14 | 63% | 13% | 25% |
| Example 15 | Toner 15 | 63% | 13% | 25% |
| Example 16 | Toner 16 | 63% | 13% | 25% |
| Example 17 | Toner 17 | 63% | 13% | 25% |
| Example 18 | Toner 18 | 63% | 13% | 25% |
| Example 19 | Toner 19 | 83% | 17% | 0% |
| Example 20 | Toner 20 | 83% | 17% | 0% |
| Example 21 | Toner 21 | 63% | 13% | 25% |
| Example 22 | Toner 22 | 63% | 13% | 25% |
| Example 23 | Toner 23 | 63% | 13% | 25% |

TABLE 4-continued

| | Toner | Ratio relative to total amount of crystalline materials | | |
|---|---|---|---|---|
| | | Crystalline material A | Crystalline material B | Crystalline material C |
| Example 24 | Toner 24 | 50% | 30% | 20% |
| Example 25 | Toner 25 | 56% | 22% | 22% |
| Example 26 | Toner 26 | 67% | 7% | 27% |
| Example 27 | Toner 27 | 77% | 8% | 15% |
| Example 28 | Toner 28 | 83% | 8% | 8% |
| Example 29 | Toner 29 | 63% | 13% | 25% |
| Example 30 | Toner 30 | 71% | 10% | 19% |
| Example 31 | Toner 31 | 71% | 10% | 19% |
| Example 32 | Toner 32 | 71% | 10% | 19% |
| Example 33 | Toner 33 | 71% | 10% | 19% |
| Example 34 | Toner 34 | 71% | 10% | 19% |
| Example 35 | Toner 35 | 71% | 10% | 19% |
| Example 36 | Toner 36 | 71% | 10% | 19% |
| Example 37 | Toner 37 | 71% | 10% | 19% |
| Example 38 | Toner 38 | 71% | 10% | 19% |
| Example 39 | Toner 39 | 71% | 10% | 19% |
| Example 40 | Toner 40 | 71% | 10% | 19% |
| Example 41 | Toner 41 | 71% | 10% | 19% |
| Comparative Example 1 | Toner 42 | 79% | 21% | 0% |
| Comparative Example 2 | Toner 43 | 79% | 21% | 0% |
| Comparative Example 3 | Toner 44 | 88% | 12% | 0% |
| Comparative Example 4 | Toner 45 | 83% | 17% | 0% |
| Comparative Example 5 | Toner 46 | 83% | 17% | 0% |
| Comparative Example 6 | Toner 47 | 83% | 17% | 0% |
| Comparative Example 7 | Toner 48 | 63% | 13% | 25% |
| Comparative Example 8 | Toner 49 | 71% | 10% | 19% |

Examples 1 to 41 and Comparative Examples 1 to 8

The obtained Toners 1 to 49 were subjected to performance evaluations using the methods described below.

The results are shown in Table 5 and Table 6.

TABLE 5

| | Toner | Low temperature fixability Rank | Lowest fixing temperature | Initial gloss | Gloss after being left for 1 day at 50° C. Rank | Gloss after being left for 1 day at 50° C. Δgloss | Gloss after being left for 3 days at 50° C. Rank | Gloss after being left for 3 days at 50° C. Δgloss | Gloss after being left for 2 weeks at 50° C. Rank | Gloss after being left for 2 weeks at 50° C. Δgloss |
|---|---|---|---|---|---|---|---|---|---|---|
| Example 1 | Toner 1 | A | 170 | 62 | A | 0 | A | 1 | A | 2 |
| Example 2 | Toner 2 | A | 170 | 61 | A | 1 | B | 5 | B | 6 |
| Example 3 | Toner 3 | A | 170 | 63 | A | 2 | B | 5 | B | 5 |
| Example 4 | Toner 4 | A | 170 | 61 | A | 1 | B | 6 | B | 6 |
| Example 5 | Toner 5 | A | 170 | 62 | A | 0 | A | 1 | A | 1 |
| Example 6 | Toner 6 | AB | 180 | 63 | A | 0 | A | 1 | A | 1 |
| Example 7 | Toner 7 | AB | 180 | 60 | A | 0 | A | 0 | A | 2 |
| Example 8 | Toner 8 | B | 190 | 60 | A | 0 | A | 1 | A | 2 |
| Example 9 | Toner 9 | B | 190 | 61 | A | 0 | A | 2 | A | 1 |
| Example 10 | Toner 10 | AB | 180 | 62 | A | 0 | A | 1 | A | 1 |
| Example 11 | Toner 11 | B | 190 | 61 | A | 1 | A | 1 | A | 2 |
| Example 12 | Toner 12 | C | 200 | 63 | B | 4 | B | 5 | C | 8 |
| Example 13 | Toner 13 | B | 190 | 62 | A | 1 | B | 5 | B | 6 |
| Example 14 | Toner 14 | C | 200 | 60 | A | 1 | A | 1 | B | 5 |
| Example 15 | Toner 15 | B | 190 | 62 | A | 2 | B | 5 | B | 5 |
| Example 16 | Toner 16 | C | 200 | 62 | A | 1 | A | 1 | B | 4 |
| Example 17 | Toner 17 | AB | 180 | 63 | A | 1 | A | 2 | A | 1 |
| Example 18 | Toner 18 | AB | 180 | 64 | A | 2 | B | 4 | B | 5 |
| Example 19 | Toner 19 | AB | 180 | 62 | C | 8 | C | 9 | C | 9 |
| Example 20 | Toner 20 | C | 200 | 62 | C | 8 | C | 9 | C | 9 |
| Example 21 | Toner 21 | AB | 180 | 61 | A | 1 | A | 2 | A | 2 |
| Example 22 | Toner 22 | AB | 180 | 61 | B | 4 | B | 6 | C | 8 |
| Example 23 | Toner 23 | AB | 180 | 60 | B | 5 | B | 5 | C | 9 |
| Example 24 | Toner 24 | AB | 180 | 60 | B | 4 | C | 7 | C | 8 |
| Example 25 | Toner 25 | AB | 180 | 64 | A | 1 | A | 1 | A | 1 |
| Example 26 | Toner 26 | AB | 180 | 61 | A | 1 | A | 1 | A | 2 |
| Example 27 | Toner 27 | AB | 180 | 61 | A | 2 | A | 2 | A | 2 |
| Example 28 | Toner 28 | AB | 180 | 64 | A | 0 | A | 1 | A | 2 |
| Example 29 | Toner 29 | B | 190 | 62 | A | 1 | A | 1 | A | 2 |
| Example 30 | Toner 30 | AB | 180 | 61 | A | 1 | A | 1 | A | 2 |
| Example 31 | Toner 31 | A | 170 | 60 | A | 1 | A | 2 | A | 2 |
| Example 32 | Toner 32 | A | 170 | 62 | A | 1 | A | 1 | A | 2 |
| Example 33 | Toner 33 | AB | 180 | 63 | C | 7 | C | 8 | C | 9 |
| Example 34 | Toner 34 | AB | 180 | 60 | A | 0 | A | 0 | A | 2 |
| Example 35 | Toner 35 | A | 170 | 60 | A | 1 | A | 1 | A | 2 |
| Example 36 | Toner 36 | A | 170 | 61 | A | 1 | A | 2 | A | 2 |
| Example 37 | Toner 37 | A | 170 | 62 | A | 1 | A | 1 | A | 1 |
| Example 38 | Toner 38 | A | 170 | 61 | A | 1 | A | 2 | A | 2 |
| Example 39 | Toner 39 | A | 170 | 64 | A | 0 | A | 0 | A | 1 |
| Example 40 | Toner 40 | A | 170 | 63 | A | 0 | A | 0 | A | 1 |
| Example 41 | Toner 41 | A | 170 | 62 | A | 2 | A | 2 | B | 6 |

TABLE 6

| | Toner | Low temperature fixability Rank | Lowest fixing temperature | Initial gloss | Gloss after being left for 1 day at 50° C. Rank | Gloss after being left for 1 day at 50° C. Δgloss | Gloss after being left for 3 days at 50° C. Rank | Gloss after being left for 3 days at 50° C. Δgloss | Gloss after being left for 2 weeks at 50° C. Rank | Gloss after being left for 2 weeks at 50° C. Δgloss |
|---|---|---|---|---|---|---|---|---|---|---|
| Comparative Example 1 | Toner 42 | A | 170 | 61 | C | 9 | D | 13 | E | 23 |
| Comparative Example 2 | Toner 43 | A | 170 | 62 | C | 8 | D | 11 | E | 23 |
| Comparative Example 3 | Toner 44 | A | 170 | 62 | C | 8 | D | 13 | E | 21 |
| Comparative Example 4 | Toner 45 | D | 210 | 63 | B | 6 | C | 8 | D | 13 |
| Comparative Example 5 | Toner 46 | C | 200 | 61 | C | 7 | D | 14 | D | 15 |
| Comparative Example 6 | Toner 47 | C | 200 | 62 | C | 8 | D | 12 | D | 15 |
| Comparative Example 7 | Toner 48 | B | 190 | 62 | C | 8 | D | 11 | E | 20 |
| Comparative Example 8 | Toner 49 | A | 170 | 61 | C | 9 | D | 15 | E | 21 |

Low-Temperature Fixability

Low-temperature fixability was evaluated in the following way. A color laser printer (HP Color LaserJet Enterprise Color M751dn, produced by HP) from which the fixing unit had been removed was prepared, and the toner in the cyan cartridge was removed and replaced with a toner to be evaluated.

An unfixed toner image (having a toner laid-on level of 0.45 $mg/cm^2$) having a length of 2.0 cm and a width of 5.0 cm was formed using this toner on an image-receiving paper (HP Laser Jet 90, produced by HP, 90 $g/m^2$) on a part of the paper 1.0 cm from the upper edge in the paper passing direction. The removed fixing unit was modified so that the fixing temperature could be adjusted, and unfixed images were subjected to fixing tests using this modified fixing unit.

Under normal temperature and humidity (23° C., 60% RH), unfixed images were fixed at temperatures that increased at intervals of 10° C., with the initial temperature being 100° C. The obtained fixed images were leave at rest for 1 day under normal temperature and humidity (a temperature of 23° C. and a relative humidity of 60%), after which the image gloss of the fixed images was measured and low-temperature fixability was evaluated. Image gloss was measured using a Handy Gloss Meter PG-1 (produced by Nippon Denshoku Industries Co., Ltd.). Measurement conditions were such that the light projection angle and the light receiving angle were each set to 75°, measurements were carried out at five different points on a fixed image, and the average value thereof was taken to be the initial gloss value after fixing. The fixing temperature was taken to be the lowest fixing temperature at which the fixed image gloss exceeded 60.

Image Gloss Stability

A printed image at the lowest fixing temperature in the low temperature fixing test described above was left in an environment at a temperature of 50° C. and a humidity of 30% for 1 day, 3 days or 2 weeks, and then left in a normal temperature and humidity (a temperature of 23° C. and a relative humidity of 60%) for 1 day. Image gloss was then measured and compared to the initial gloss value after fixing. Image gloss stability was evaluated according to the following criteria.

A: Image gloss variation range of not more than 3

B: Image gloss variation range of more than 3 and less than 6

C: Image gloss variation range of more than 6 and less than 10

D: Image gloss variation range of more than 10 and less than 15

E: Image gloss variation range of more than 15

Good results were obtained for all evaluation items with Examples 1 to 41. However, Comparative Examples 1 to 8 produced inferior results the examples for any of the evaluation items. Based on the above results, the present disclosure makes it possible to obtain a toner which exhibits excellent low-temperature fixability and can suppress changes in gloss over time in a printed image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2021-040525, filed Mar. 12, 2021, which is hereby incorporated by reference herein in its entirety.

What is claimed is:

1. A toner, comprising:

a toner particle, the toner particle comprising a binder resin, a crystalline material A, a crystalline material B and a crystalline material C;

the binder resin comprising a resin M in an amount of at least 70 mass % relative to a total mass of the binder resin;

crystalline material A having a melting point of 50 to 100.0° C.;

a content of crystalline material A relative to the total amount of crystalline materials in the toner is at least 56 mass %, and wherein $$50 \leq MpB \times \Delta SPBM^2 - MpA \times \Delta SPAM^2 \leq 450$$

$$400 \leq MpA \leq 2000$$

$$400 \leq MpB \leq 2000$$

$$400 \leq MpC \leq 2000$$

$$MpA \times \Delta SPAM^2 \leq 800$$

$$\Delta SPAB \leq 0.26$$

$$0 \leq MpC \times \Delta SPCM^2 - MpB \times \Delta SPBM^2$$

$$800 \leq MpC \times \Delta SPCM^2$$

when ΔSPAM $(cal/cm^3)^{1/2}$ is an absolute value of a difference between a SP value of resin M and a SP value of crystalline material A, ΔSPBM $(cal/cm^3)^{1/2}$ is an absolute value of a difference between a SP value of resin M and a SP value of crystalline material B, ΔSPAB $(cal/cm^3)^{1/2}$ is an absolute value of a difference between a SP value of crystalline material A and a SP value of crystalline material B, MpA is a peak molecular weight Mp of crystalline material A, MpB is a peak molecular weight Mp of crystalline material B, ΔSPCM $(cal/cm^3)^{1/2}$ is an absolute value of a difference between a SP value of resin M and a SP value of crystalline material C, and MpC is a peak molecular weight Mp of crystalline material C.

2. The toner according to claim 1, wherein crystalline material C is at least one member selected from the group consisting of a hydrocarbon wax, a tetrafunctional ester wax and a hexafunctional ester wax.

3. The toner according to claim 1, wherein $0 \leq \Delta SPAC - \Delta SPBC$ when ΔSPAC $(cal/cm^3)^{1/2}$ is an absolute value of a difference between a SP value of crystalline material A and a SP value of crystalline material C, and ΔSPBC $(cal/cm^3)^{1/2}$ is an absolute value of a difference between a SP value of crystalline material B and a SP value of crystalline material C.

4. The toner according to claim 1, wherein $XA - XB \geq 0$ when XA (mass %) is a content of the crystalline material A in the toner, and XB (mass %) is a content of the crystalline material B in the toner.

5. The toner according to claim 1, wherein crystalline material B is a condensate of an aliphatic dicarboxylic acid having 2 to 10 carbons and an aliphatic monoalcohol having 14 to 24 carbons.

6. The toner according to claim 1, wherein crystalline material A is a condensate of an aliphatic diol having 2 to 10 carbons and an aliphatic monocarboxylic acid having 14 to 24 carbons.

7. The toner according to claim 1, wherein the toner further comprises an external additive which is a fatty acid metal salt.

8. The toner according to claim 1, wherein resin M is a vinyl-based resin.

9. The toner according to claim 1, wherein resin M is a vinyl-based resin, crystalline material A is a condensate of an aliphatic diol having 2 to 10 carbons and an aliphatic monocarboxylic acid having 14 to 24 carbons, crystalline material B is a condensate of an aliphatic dicarboxylic acid having 2 to 10 carbons and an aliphatic monoalcohol having 14 to 24 carbons, and crystalline material C is at least one member selected from the group consisting of a hydrocarbon wax, a tetrafunctional ester wax and a hexafunctional ester wax.

10. The toner according to claim 1, wherein the content of the crystalline material A relative to the total amount of crystalline materials in the toner is at least 90 mass %.

* * * * *